US012109621B2

(12) United States Patent
Dang et al.

(10) Patent No.: US 12,109,621 B2
(45) Date of Patent: Oct. 8, 2024

(54) ULTRA-LONG SILVER NANOWIRE MATERIAL AND FABRICATION METHOD THEREOF

(71) Applicant: NORTHWEST INSTITUTE FOR NONFERROUS METAL RESEARCH, Xi'an (CN)

(72) Inventors: Rui Dang, Xi'an (CN); Jing Zheng, Xi'an (CN)

(73) Assignee: NORTHWEST INSTITUTE FOR NONFERROUS METAL RESEARCH, Xi'an (CN)

(*) Notice: Subject to any disclaimer, the term of this patent is extended or adjusted under 35 U.S.C. 154(b) by 0 days.

(21) Appl. No.: 18/274,227

(22) PCT Filed: Nov. 3, 2022

(86) PCT No.: PCT/CN2022/129423
§ 371 (c)(1),
(2) Date: Jul. 26, 2023

(87) PCT Pub. No.: WO2023/078320
PCT Pub. Date: May 11, 2023

(65) Prior Publication Data
US 2024/0082917 A1    Mar. 14, 2024

(30) Foreign Application Priority Data
Nov. 8, 2021 (CN) .......................... 202111311807.3

(51) Int. Cl.
*B22F 9/24* (2006.01)
*B22F 1/054* (2022.01)
*B82Y 40/00* (2011.01)

(52) U.S. Cl.
CPC .............. *B22F 9/24* (2013.01); *B22F 1/0547* (2022.01); *B82Y 40/00* (2013.01); *B22F 2301/255* (2013.01)

(58) Field of Classification Search
CPC ..................................... B22F 1/0547
See application file for complete search history.

(56) References Cited

U.S. PATENT DOCUMENTS 8,876,937 B2 * 11/2014 Peng .......................... B22F 9/24
977/762
9,034,075 B2 * 5/2015 Lunn ......................... H01B 1/02
75/370

(Continued)

FOREIGN PATENT DOCUMENTS

CN        101934378 A  *  1/2011
CN        102744417 A     10/2012

(Continued)

OTHER PUBLICATIONS

Athens G.L., et al.; "Hydrothermal Synthesis of Silver Nanowires and Application as Transparent Conductive Materials"; Advanced Materials: Techconnect Briefs, 2015, pp. 211-214 (Year: 2015).*

(Continued)

*Primary Examiner* — Alexandra M Moore
*Assistant Examiner* — Austin Pollock
(74) *Attorney, Agent, or Firm* — Bayramoglu Law Offices LLC

(57) ABSTRACT

An ultra-long silver nanowire material and a fabrication method thereof are provided. The fabrication method includes the following steps: step 1: adding a reducing sugar and polyvinylpyrrolidone (PVP) to deionized water to obtain a clear solution; step 2: mixing the clear solution with a metal ion solution to obtain a mixed solution A; step 3: mixing the mixed solution A with a halide solution to obtain a mixed solution B; step 4: adding a silver ion-containing (Continued)

solution dropwise to the mixed solution B to obtain a reaction solution and conducting a reaction at 110° C. to 130° C. for 14 h to 20 h to obtain a flocculent product; and step 5: subjecting the flocculent product to sedimentation washing with deionized water and absolute ethanol successively to obtain the ultra-long silver nanowire material. The fabrication method of the present disclosure is low in cost, environmentally friendly, and conducive to industrial production.

6 Claims, 3 Drawing Sheets

(56) References Cited

U.S. PATENT DOCUMENTS

| | | | | |
|---|---|---|---|---|
| 9,070,488 | B2 * | 6/2015 | Ikada | H01B 1/00 |
| 9,776,249 | B2 * | 10/2017 | Wang | B22F 9/24 |
| 9,969,005 | B2 * | 5/2018 | McGough | B22F 9/24 |
| 9,999,926 | B2 * | 6/2018 | McGough | B22F 9/24 |
| 10,081,020 | B2 * | 9/2018 | Athens | B03B 5/66 |
| 10,081,059 | B2 * | 9/2018 | Ziebarth | B22F 1/0547 |
| 2005/0056118 | A1 | 3/2005 | Xia et al. | |
| 2015/0266096 | A1 | 9/2015 | Hou et al. | |
| 2020/0306836 | A1 * | 10/2020 | Wang | B22F 1/07 |
| 2021/0213531 | A1 * | 7/2021 | Meshkat Mamalek | B22F 1/0547 |

FOREIGN PATENT DOCUMENTS

| | | | | |
|---|---|---|---|---|
| CN | 102744421 A | * | 10/2012 | |
| CN | 103157807 A | | 6/2013 | |
| CN | 103203468 A | | 7/2013 | |
| CN | 103313813 A | | 9/2013 | |
| CN | 104209538 A | | 12/2014 | |
| CN | 104313687 A | | 1/2015 | |
| CN | 106077704 A | | 11/2016 | |
| CN | 106563812 A | * | 4/2017 | |
| CN | 108555310 A | * | 9/2018 | |
| CN | 108856726 A | | 11/2018 | |
| CN | 109095782 A | | 12/2018 | |
| CN | 110170644 A | * | 8/2019 | B22F 1/0081 |
| CN | 110369732 A | * | 10/2019 | |
| CN | 110560705 A | | 12/2019 | |
| CN | 111992736 A | | 11/2020 | |
| CN | 112496337 A | | 3/2021 | |
| CN | 114029499 A | | 2/2022 | |
| JP | 2010261090 A | * | 11/2010 | |
| JP | 2020066760 A | | 4/2020 | |
| KR | 20210044042 A | * | 4/2021 | |
| WO | WO-2019034623 A1 | * | 2/2019 | B22F 1/0025 |

OTHER PUBLICATIONS

Bari B., et al.; "Simple Hydrothermal Synthesis of very-long and thin silver nanowires and their application in high quality transparent electrodes"; J. Mater. Chem. A, 2016, 4, pp. 11365-11371 (Year: 2016).*

Basarir F.; et al. "Ultra-long silver nanowires prepared via hydrothermal synthesis enable efficient transparent heaters"; Nanoscale Adv., 2022, 4, 4410-4417 (Year: 2022).*

Chao Luo, et al., Preparation of Silver Nanowire Using Hydrothermal Method and Investigation into Its Growth Mechanism, Journal of Xihua University (Natural Science), 2008, pp. 70-72, 4,5, vol. 27 No. 6.

* cited by examiner

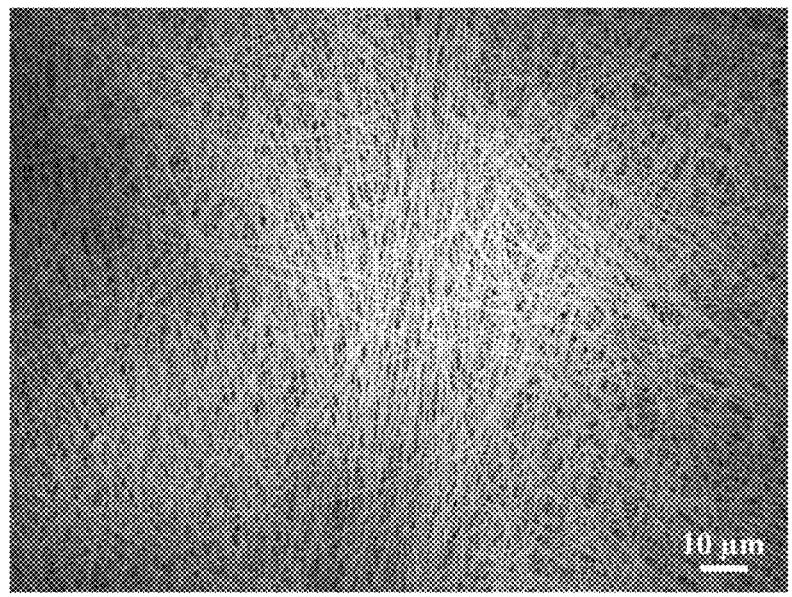
FIG. 1
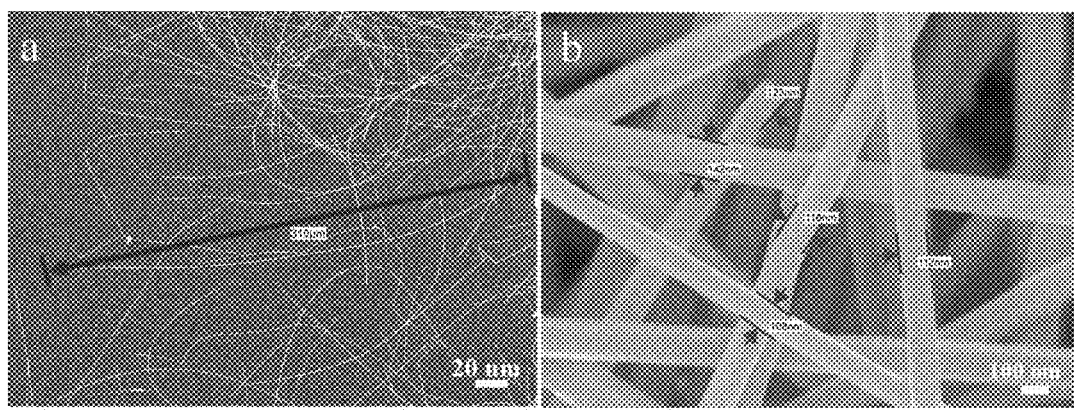
FIG. 2A                    FIG. 2B
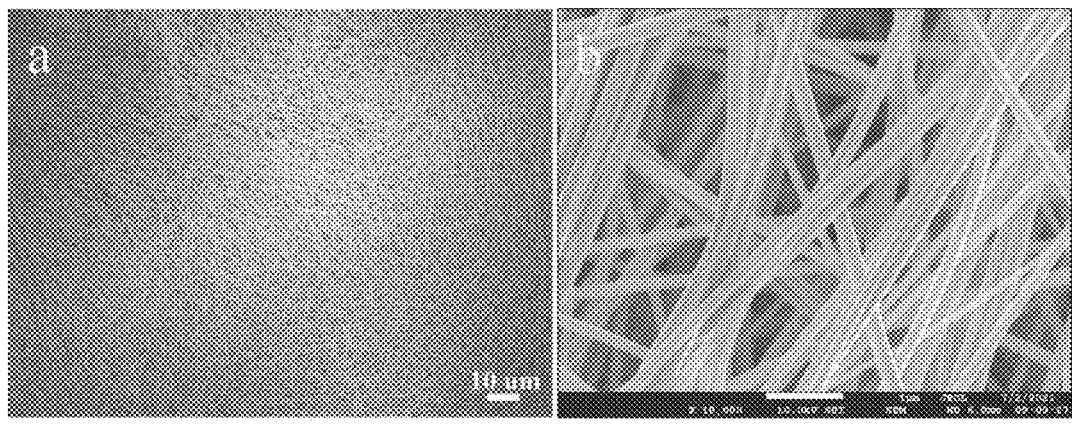
FIG. 3A                    FIG. 3B

ULTRA-LONG SILVER NANOWIRE MATERIAL AND FABRICATION METHOD THEREOF

CROSS REFERENCE TO THE RELATED APPLICATIONS

This application is the national phase entry of International Application No. PCT/CN2022/129423, filed on Nov. 3, 2022, which is based upon and claims priority to Chinese Patent Application No. 202111311807.3, filed on Nov. 8, 2021, the entire contents of which are incorporated herein by reference.

TECHNICAL FIELD

The present disclosure belongs to the technical field of noble metal nanomaterials and specifically relates to an ultra-long silver nanowire material and a fabrication method thereof.

BACKGROUND

With the development of nanomaterial preparation technologies and the demand for flexible electronic products, new nanomaterials tend to be used instead of metal oxide films in research inside and outside China, such as graphene, carbon nanotubes (CNTs), composite nanomaterials, metal meshes, and metal nanowires. Since these nanomaterials have high direct current (DC) conductivity, ultrathin films fabricated by these nanomaterials have excellent electrical conductivity, and thus, transparent electrodes with excellent performance can be fabricated by the ultrathin films, which can overcome the shortcomings of traditional electrodes such as mechanical brittleness and poor flexibility. Silver nanowires, as one-dimensional (1D) metal nanomaterials, have a high length-to-diameter ratio and can form an irregular network structure on a substrate material; thus, an electrode fabricated by a silver nanowire has a small bend radius and exhibits a small resistance change rate during bending. In addition, a transparent electrode fabricated by an ultra-long silver nanowire material has lower haze and better light transmittance than electrodes fabricated by other new nanomaterials.

The current fabrication methods of silver nanowires can be divided into physical methods and chemical methods. The physical methods include magnetron sputtering, ultrasonic crushing, and mechanical crushing. The chemical methods include hydrothermal synthesis, photochemical reduction, electrochemical process, template synthesis, ultrasonic reduction, and polyol process. The physical methods are complicated, have high energy consumption and high technical requirements, and lead to silver nanowire products with poor morphological uniformity and seriously limited specifications. Compared with the physical methods, the chemical liquid-phase synthesis method is the most common method for the controlled synthesis of nanomaterials, which involves a simple process and a low cost and can achieve the regulation of the morphology and size of a nanomaterial during a simple liquid-phase reaction. The chemical liquid-phase synthesis method is most promising for the industrial production of ultra-long silver nanowire materials. The fabrication of an ultra-long silver nanowire material with a polyol proposed by Xia Younan is a widely-accepted and widely-used technical method. In the above method, ethylene glycol (EG) is most commonly used as a solvent, polyvinylpyrrolidone (PVP) is used as a surfactant to control the adhesion between silver nanowires, and a control agent is added to produce a colloid with $Ag^+$ to control the reduction rate of $Ag^+$ and the growth rate of a silver nanowire, such that an ultra-long silver nanowire material is finally obtained. On this basis, a lot of studies have been conducted. Through the exploration of the mechanism and various influencing parameters of the method, silver nanowires of different specifications are fabricated. However, the above method still has a cumbersome fabrication process, requires the fine control of a feeding process, and involves many influencing factors, and most of the reported fabrication scales of the method are still at milligram and gram levels, which is very unfavorable to the macro-fabrication of silver nanowires. In addition, the polyol process requires the use of an organic reagent (EG, glycerol, or the like) as a solvent and a reducing agent, such that the reaction solution has a high viscosity, which brings difficulties to the subsequent washing of the product and causes pollution to the environment. The length-to-diameter ratio of an ultra-long silver nanowire material has a great impact on the performance of the corresponding flexible transparent electrode. Under the same sheet resistance and diameter, the transmittance of nanowires is inversely proportional to the number of nanowires. The transmittance of a transparent electrode fabricated by a long silver nanowire is higher than the transmittance of a transparent electrode fabricated by a short silver nanowire, and the photoelectric performance of a transparent electrode fabricated by a long silver nanowire is better than the photoelectric performance of a transparent electrode fabricated by a short nanowire. However, a silver nanowire material fabricated by the polyol process is generally short. There are few reports on ultra-long silver nanowire materials with a length of 70 μm or more, and these ultra-long silver nanowire materials have an extremely small scale and poor repeatability, which greatly restricts the industrial application of ultra-long silver nanowire materials in the field of flexible electrodes.

With the continuous expansion of the application field of ultra-long silver nanowire materials, the fabrication methods of ultra-long silver nanowire materials are further developed. A development trend of the fabrication methods is as follows: Based on the chemical liquid-phase synthesis method, an environmentally-friendly technical process is developed to reduce the influence of the environment on crystal growth, and the technical process tends to have low cost, low consumption, and low pollution. A fabricated ultra-long silver nanowire material needs to be easily washed and meet the needs of industrial production, thereby realizing industrial production. Moreover, according to the development needs of the field of flexible electronics, special attention will be paid to the fabrication technologies of ultra-long silver nanowire materials in the future to meet the application requirements of electrical conductivity, transparency, and bending of flexible electronic devices.

SUMMARY

The technical problem to be solved by the present disclosure is to provide an ultra-long silver nanowire material and a fabrication method thereof given the deficiencies in the prior art. Since the current commercial fabrication processes for ultra-long silver nanowire materials all require the use of a polyol organic system and have problems such as large viscosity of the product solution, difficulty in washing, heavy pollution, harsh reaction conditions, or the like, the present disclosure provides a fabrication method of an ultra-long silver nanowire material that is implemented in an aqueous solution system, does not require the participation of an organic solvent and the protection of the inert atmosphere, and is low cost, environmentally friendly, and conducive to industrial production.

To solve the above technical problem, the present disclosure adopts the following technical solutions. A fabrication method of an ultra-long silver nanowire material is provided, including the following steps:

step 1: adding a reducing sugar and PVP to deionized water and thoroughly stirring to obtain a clear solution;

step 2: mixing the clear solution with a metal ion solution to obtain a mixed solution A;

step 3: mixing the mixed solution A with a halide solution to obtain a mixed solution B;

step 4: adding a silver ion-containing solution dropwise to the mixed solution B, stirring to obtain a reaction solution, transferring the reaction solution to a hydrothermal reactor, and conducting a reaction at 110° C. to 130° C. for 14 h to 20 h to obtain a flocculent product; and step 5: subjecting the flocculent product to sedimentation washing with deionized water and absolute ethanol successively to obtain the ultra-long silver nanowire material with a length-to-diameter ratio of greater than 3,000.

In some preferred embodiments, the fabrication method includes the following steps:

step 1: adding glucose and PVP to deionized water and thoroughly stirring to obtain a clear solution;

step 2: adding a copper sulfate solution to the clear solution obtained in step 1 and thoroughly stirring to obtain a mixed solution A;

step 3: adding a sodium chloride solution to the mixed solution A obtained in step 2 and thoroughly stirring to obtain a mixed solution B;

step 4: adding a silver nitrate solution dropwise to the mixed solution B obtained in step 3, stirring to obtain a reaction solution, transferring the reaction solution to a hydrothermal reactor, and conducting a reaction at 110° C. to 130° C. for 14 h to 20 h to obtain a flocculent product; and step 5: subjecting the flocculent product obtained in step 4 to sedimentation washing with deionized water and absolute ethanol successively to obtain the ultra-long silver nanowire material with a length-to-diameter ratio of greater than 3,000.

In the present disclosure, a reducing sugar (such as glucose), PVP, and deionized water are first mixed, then a metal ion solution (such as a copper sulfate solution) and a halide solution (such as a sodium chloride solution) are successively added, then a silver ion-containing solution (such as a silver nitrate solution) is added, and a reaction is conducted to obtain an ultra-long silver nanowire material. In the present disclosure, an environmentally-friendly mild reducing sugar (such as glucose) is used as the reducing agent and solvent instead of a polyol, which effectively reduces the viscosity of the reaction solution, facilitates the washing of the product, and effectively controls the cost of the reactants. In the present disclosure, a very small amount of PVP is used as a surfactant, which prevents the product from being affected by active agent coating, thereby improving the application stability. In the present disclosure, water is used as a solvent, which can effectively reduce environmental pollution. In the present disclosure, an aqueous solution system is used instead of an organic solution system. When an organic system is used, an inert gas generally needs to be introduced into an organic solution to remove dissolved oxygen (DO) in the organic solution, because the oxygen will consume a five-fold twin structure produced at an initial stage of silver precipitation in a large quantity and the five-fold twin structure is a prerequisite for the growth of a silver nanocrystal into a nanowire. In the presence of oxygen, five-fold twins will grow into particles, and even if the reaction time is increased, particles are produced, such that a large number of silver nanoparticles will appear in the reaction system, which brings great difficulties to the subsequent sample treatment. In the present disclosure, an aqueous solution system is used, and a twin structure produced by this system is not sensitive to oxygen in a solution, such that a five-fold twin structure can be maintained without the introduction of an inert gas and the final product basically has a nanowire structure. In the present disclosure, the whole reaction is conducted at room temperature, and there is no need to introduce an inert gas for protection, which is conducive to industrial production and involves convenient process and low energy consumption.

In the present disclosure, a solvent for the solutions is water.

In the present disclosure, the reducing sugar may be one or more selected from the group consisting of glucose, maltose, fructose, sucrose, and galactose and may be preferably glucose.

In the present disclosure, the metal ion solution may be one or more selected from the group consisting of a nickel nitrate solution, a nickel sulfate solution, an iron nitrate solution, a ferrous sulfate solution, a copper sulfate solution, a copper nitrate solution, and a manganese sulfate solution and may be preferably a copper sulfate solution.

In the present disclosure, the halide solution may be a potassium chloride solution and/or a sodium chloride solution.

In the present disclosure, the silver ion-containing solution may be a silver nitrate solution.

In the present disclosure, the PVP may have a molecular weight Mw of 4,000 to 1300,000 daltons and preferably 8,000 to 100,000 daltons, such as 24,000 or 58,000 daltons.

In the present disclosure, in step 1, the reducing sugar, the PVP, and the deionized water may be in a molar ratio of 1:(0.05-0.1):(280-560) and preferably 1:(0.05-0.1):(350-550), such as 1:0.05:400, 1:0.06:430, 1:0.08:350, 1:0.07:550, 1:0.06:450, or 1:0.1:500. In some specific embodiments, in step 1, the glucose, the PVP, and the deionized water are in a molar ratio of 1:(0.05-0.1):(280-560).

In the present disclosure, the reducing sugar (such as glucose) is used as a reducing agent and the PVP is used as a structure-directing agent. The molar ratio of the reducing sugar (such as glucose), PVP, and deionized water is controlled to ensure that a final product has an ultra-long nanowire structure and that the generation of nanoparticles is avoided. A very small amount of surfactant is used, which brings convenience to processes such as product washing.

In the present disclosure, in step 2, a molar ratio of the reducing sugar to a metal ion in the mixed solution A may be 1:(480-600) and preferably 1:(500-580), such as 1:550, 1:560, or 1:567.

In some specific embodiments, in step 2, a molar ratio of the glucose to copper sulfate in the mixed solution A is 1:(480-600).

In the present disclosure, the molar ratio of the reducing sugar (such as glucose) to the metal ion (such as copper sulfate) is controlled to ensure that the final product has a nanowire structure and that the generation of nanoparticles is avoided.

In the present disclosure, in step 3, a molar ratio of a halide to the metal ion in the mixed solution B may be 1:(2.5-4.8) and preferably 1:(3-4.5), such as 1:3.67, 1:4, or 1:4.17.

In some specific embodiments, in step 3, the molar ratio of sodium chloride to the copper sulfate in the mixed solution B is 1:(3-4.8).

In the present disclosure, the molar ratio of the halide (such as sodium chloride) to the metal ion (such as copper sulfate) is controlled to ensure that a final product has a nanowire structure and that the generation of nanoparticles is avoided.

In the present disclosure, in step 4, a molar ratio of the reducing sugar to a silver ion in the reaction solution may be 1:(300-500) and preferably 1:(350-480), such as 1:400, 1:440, or 1:450.

In some specific embodiments, in step 4, the molar ratio of the glucose to silver nitrate in the reaction solution is 1:(300-500).

In the present disclosure, the reducing sugar (such as glucose) is used as a reducing agent to reduce the silver ion (such as silver nitrate) into nano-silver, and thus it is necessary to control a proportion of the reducing agent. If the amount of the reducing agent is too low, silver nitrate cannot be reduced into silver; if the amount of the reducing agent is too high, a reaction will be too fast, which is not conducive to the growth of a nanowire structure.

In the present disclosure, in step 5, the sedimentation washing is conducted as follows: adding the flocculent product to the deionized water, shaking a resulting mixture, and allowing the mixture to stand until the flocculent product and the deionized water are separated; removing a resulting supernatant, adding the deionized water, and repeating the above process 3 to 5 times; adding the flocculent product to absolute ethanol, shaking a resulting mixture, and allowing the mixture to stand until the flocculent product and the absolute ethanol are separated; and removing a resulting supernatant, adding the absolute ethanol, and repeating the above process 3 to 5 times. Under normal circumstances, a nanomaterial needs to undergo centrifugal washing. However, because the product obtained in the present disclosure is an ultra-long silver nanowire and when centrifugal washing is conducted at an improper centrifugal speed, the ultra-long silver nanowire will undergo irreversible agglomeration, which affects the subsequent use of the nanowire. Therefore, sedimentation washing is adopted in the present disclosure, which will not cause the agglomeration of the nanowire. In the present disclosure, deionized water and absolute ethanol are used for cleaning to effectively remove inorganic and organic impurities with a prominent cleaning effect.

In the present disclosure, in steps 1, 2, and 3, the stirring is conducted at room temperature.

In the present disclosure, in steps 2 and 3, the stirring is conducted for 0.5 h to 2 h.

The present disclosure also provides an ultra-long silver nanowire material fabricated by the fabrication method described above.

Compared with the prior art, the present disclosure has the following advantages:

1. The present disclosure allows conducting a reaction in an aqueous solution system, does not require the use of any organic solvent (not like the current process of fabricating an ultra-long silver nanowire material with a polyol organic system), and provides a solution to the technical limitations such as difficult washing of an ultra-long silver nanowire material, harsh reaction conditions, and heavy pollution. Therefore, the present disclosure provides a novel fabrication method of an ultra-long silver nanowire material that is implemented in an aqueous solution system, does not require the protection of an inert atmosphere, is low in cost, is environmentally friendly, and is conducive to industrial production.

2. In the present disclosure, a reducing sugar (such as glucose) is used as a reducing agent instead of a polyol, which avoids environmental pollution; and the reducing sugar (such as glucose) is widely available and low cost and can meet the requirements of low-carbon production that are currently advocated. The product of the present disclosure is easy to wash, and the product can meet the use requirements merely through sedimentation washing, which reduces the irreversible agglomeration of the product caused by centrifugation.

3. In the present disclosure, ultra-long silver nanowires with high dispersion and no obvious agglomeration can be obtained by using only a small amount of surfactant PVP.

4. The present disclosure involves simple devices, is low in cost, has controllable process parameters, has high repeatability, and is conducive to large-scale production. The ultra-long silver nanowire material fabricated in the present disclosure is widely used in fields such as anti-bacterial materials, printed-circuit boards (PCBs), transparent conductive films, radio frequency electronic tags, catalysis, electrochemical sensing, wave absorption, and electromagnetic shielding.

BRIEF DESCRIPTION OF THE DRAWINGS

FIG. 1 is a scanning electron microscopy (SEM) image of the ultra-long silver nanowire material fabricated in Example 1 of the present disclosure.

FIGS. 2A-2B show SEM images of the ultra-long silver nanowire material fabricated in Example 1 of the present disclosure, where FIG. 2A is at a low magnification and FIG. 2B is at a high magnification.

FIGS. 3A-3B show SEM images of the ultra-long silver nanowire material fabricated in Example 2 of the present disclosure, where FIG. 3A is at a low magnification and FIG. 3B is at a high magnification.

DETAILED DESCRIPTION OF THE EMBODIMENTS

Example 1

Figure 4:
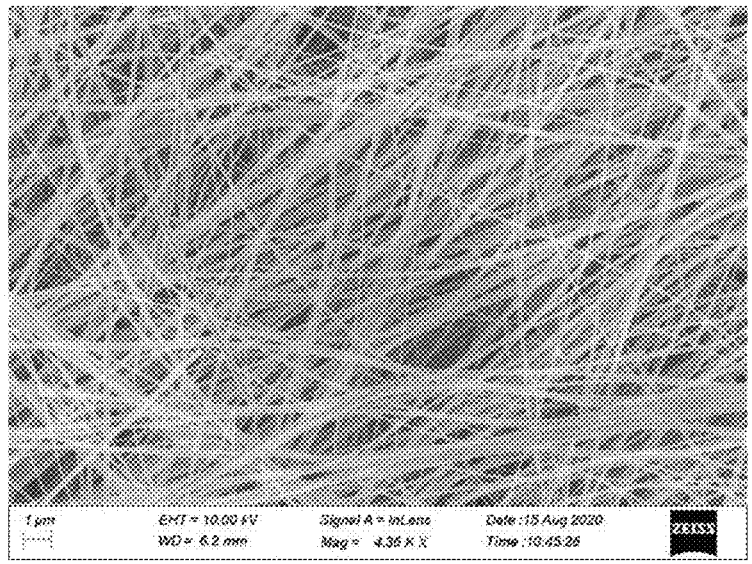
FIG. 4 is an SEM image of the ultra-long silver nanowire material fabricated in Example 3 of the present disclosure.

A fabrication method was provided in this example, including the following steps:

Step 1: Glucose and PVP with a molecular weight Mw of 58,000 daltons were added to deionized water, and the resulting mixture was thoroughly stirred to obtain a clear solution, where the glucose, PVP, and water were in a molar ratio of 1:0.1:280 and the molar mass of the glucose was 0.01 mmol.

Step 2: A copper sulfate solution was added to the clear solution obtained in step 1, and the resulting mixture was thoroughly stirred for 0.5 h to obtain a mixed solution A, where the molar mass of copper sulfate in the copper sulfate solution was 4.8 mmol.

Step 3: A sodium chloride solution was added to the mixed solution A obtained in step 2, and the resulting mixture was thoroughly stirred for 2 h to obtain a mixed solution B, where the molar mass of sodium chloride in the sodium chloride solution was 1 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 110° C. for 16 h to obtain a flocculent product, where the molar mass of silver nitrate in the silver nitrate solution was 3 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 5 times.

FIG. 1 is an SEM image of the ultra-long silver nanowire material fabricated in this example; and FIGS. 2A-2B show low-magnification and high-magnification SEM images of the ultra-long silver nanowire material fabricated in this example, respectively. It can be seen from FIG. 1 that the product has a nanowire structure with a diameter of about 130 nm; in the product, there is only a 1D nanowire structure without other impurities and morphologies, indicating a high purity; and at this magnification, a length of a single nanowire exceeds 100 μm. It can be seen from FIGS. 2A-2B that, to further understand the length of the nanowire, the nanowire is tested at low magnification in this example. Because the fabricated nanowire is indeed long and is observed at a specified magnification of instrument, it is difficult to find a whole nanowire from head to tail under a field of view, and basically an end of a nanowire is in the field of view and the other end of the nanowire is out of the field of view. In this example, a short single ultra-long silver nanowire that can be measured in the field of view is found, and this nanowire is bow-shaped and has a straight length of 318 μm from head to tail and an actual length of greater than 318 μm. Therefore, the length-to-diameter ratio of the ultra-long silver nanowire material fabricated in this example is much greater than 3,000.

Example 2

A fabrication method was provided in this example, including the following steps:

Step 1: Glucose and PVP with a molecular weight Mw of 24,000 daltons were added to deionized water, and the resulting mixture was thoroughly stirred to obtain a clear solution, where the glucose, PVP, and water were in a molar ratio of 1:0.05:400 and the molar mass of the glucose was 0.01 mmol.

Step 2: A copper sulfate solution was added to the clear solution obtained in step 1, and the resulting mixture was thoroughly stirred for 1 h to obtain a mixed solution A, where the molar mass of copper sulfate in the copper sulfate solution was 6 mmol.

Step 3: A sodium chloride solution was added to the mixed solution A obtained in step 2, and the resulting mixture was thoroughly stirred for 0.5 h to obtain a mixed solution B, where a molar mass of sodium chloride in the sodium chloride solution was 2 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 130° C. for 20 h to obtain a flocculent product, where the molar mass of silver nitrate in the silver nitrate solution was 4.8 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times.

FIGS. 3A-3B show SEM images of the ultra-long silver nanowire material fabricated in this example. It can be seen from FIGS. 3A-3B that the product has a nanowire structure; in the product, there is only a 1D nanowire structure without other impurities and morphologies, indicating a high purity; the obtained nanowires have a uniform diameter distribution, and a length-to-diameter ratio of the ultra-long silver nanowire material is much greater than 3,000.

Example 3

A fabrication method was provided in this example, including the following steps:

Step 1: Glucose and PVP with a molecular weight of 1,300,000 daltons were added to deionized water, and the resulting mixture was thoroughly stirred to obtain a clear solution, where the glucose, PVP, and water were in a molar ratio of 1:0.06:430 and the molar mass of the glucose was 0.05 mmol.

Step 2: An iron nitrate solution was added to the clear solution obtained in step 1, and the resulting mixture was stirred for 2 h to obtain a mixed solution A, where the molar mass of iron nitrate in the iron nitrate solution was 28 mmol.

Step 3: A sodium chloride solution was added to the mixed solution A obtained in step 2, and the resulting mixture was stirred for 0.5 h to obtain a mixed solution B, where the molar mass of sodium chloride in the sodium chloride solution was 7 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 115° C. for 15 h to obtain a flocculent product, where the molar mass of silver nitrate in the silver nitrate solution was 22 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times.

FIG. 4 is an SEM image of the ultra-long silver nanowire material fabricated in Example 3 of the present disclosure. It can be seen from the figure that the product has a 1D nanowire structure, and nanowires are well-dispersed and are uniform in diameter.

Example 4

A fabrication method was provided in this example, including the following steps:

Step 1: Fructose and PVP with a molecular weight of 58,000 daltons were added to deionized water, and the resulting mixture was thoroughly stirred to obtain a clear solution, where the fructose, PVP, and water were in a molar ratio of 1:0.08:350 and the molar mass of the fructose was 0.02 mmol.

Step 2: A ferrous sulfate solution was added to the clear solution obtained in step 1, and the resulting mixture was stirred for 1 h to obtain a mixed solution A, where a molar mass of ferrous sulfate in the ferrous sulfate solution was 10 mmol.

Step 3: A sodium chloride solution was added to the mixed solution A obtained in step 2, and a resulting mixture was stirred for 1.5 h to obtain a mixed solution B, where the molar mass of sodium chloride in the sodium chloride solution was 4 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 120° C. for 18 h to obtain a flocculent product, where the molar mass of silver nitrate in the silver nitrate solution was 8 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times.

Figure 5:
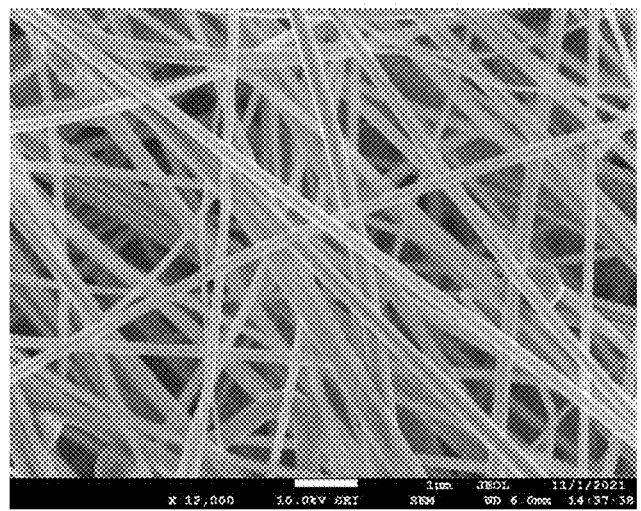
FIG. 5 is an SEM image of the ultra-long silver nanowire material fabricated in Example 4 of the present disclosure.

FIG. 5 is an SEM image of the silver nanowire material fabricated in Example 4 of the present disclosure. It can be seen from the figure that the product has a 1D nanowire structure, and nanowires are well-dispersed.

Example 5

A fabrication method was provided in this example, including the following steps:

Step 1: Sucrose and PVP with a molecular weight of 58,000 daltons were added to deionized water, and the resulting mixture was thoroughly stirred to obtain a clear solution, where the sucrose, PVP, and water were in a molar ratio of 1:0.07:550 and the molar mass of the sucrose was 0.03 mmol.

Step 2: A nickel nitrate solution was added to the clear solution obtained in step 1, and the resulting mixture was stirred for 1 h to obtain a mixed solution A, where the molar mass of nickel nitrate in the nickel nitrate solution was 17 mmol.

Step 3: A sodium chloride solution was added to the mixed solution A obtained in step 2, and the resulting mixture was stirred for 0.5 h to obtain a mixed solution B, where the molar mass of sodium chloride in the sodium chloride solution was 4 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 115° C. for 15 h to obtain a flocculent product, where the molar mass of silver nitrate in the silver nitrate solution was 12 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times.

Figure 6:
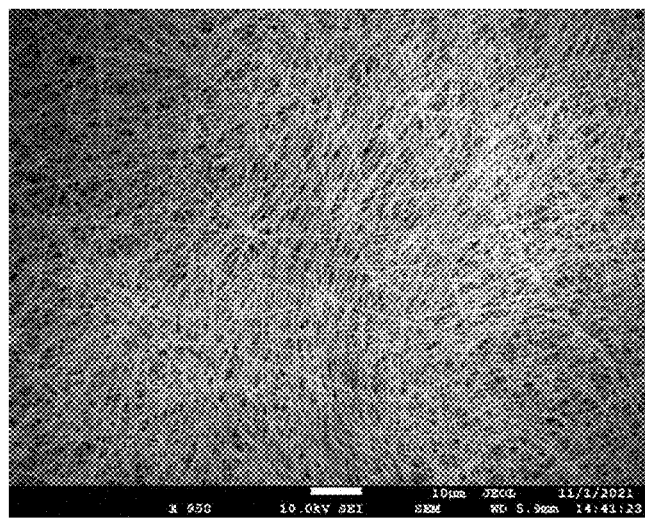
FIG. 6 is an SEM image of the ultra-long silver nanowire material fabricated in Example 5 of the present disclosure.

FIG. 6 is an SEM image of the silver nanowire material fabricated in Example 5 of the present disclosure. It can be seen from the figure that the product has a 1D nanowire structure, and nanowires are well-dispersed and have a large length, which exceeds the length that can be characterized at this magnification.

Example 6

A fabrication method was provided in this example, including the following steps:

Step 1: Glucose and PVP with a molecular weight of 58,000 daltons were added to deionized water, and the resulting mixture was thoroughly stirred to obtain a clear solution, where the glucose, PVP, and water were in a molar ratio of 1:0.06:450 and the molar mass of the glucose was 0.01 mmol.

Step 2: A copper nitrate solution was added to the clear solution obtained in step 1, and the resulting mixture was stirred for 0.5 h to obtain a mixed solution A, where the molar mass of copper nitrate in the copper nitrate solution was 5 mmol.

Step 3: A potassium chloride solution was added to the mixed solution A obtained in step 2, and the resulting mixture was stirred for 1 h to obtain a mixed solution B, where the molar mass of potassium chloride in the potassium chloride solution was 1.2 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 120° C. for 16 h to obtain a flocculent product, where the molar mass of silver nitrate in the silver nitrate solution was 4.5 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times.

Figure 7:
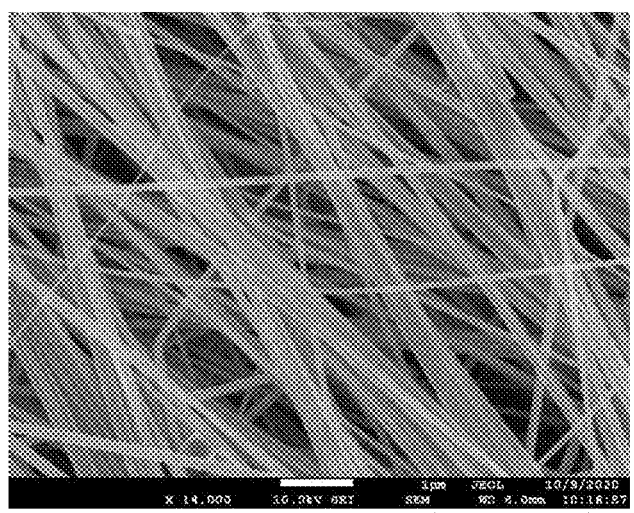
FIG. 7 is an SEM image of the ultra-long silver nanowire material fabricated in Example 6 of the present disclosure.

FIG. 7 is an SEM image of the silver nanowire material fabricated in Example 6 of the present disclosure. It can be seen from the figure that the product has a 1D nanowire structure, and nanowires are well-dispersed and are uniform in diameter.

Example 7

A fabrication method was provided in this example, including the following steps:

Step 1: Maltose and PVP with a molecular weight of 8,000 daltons were added to deionized water, and the resulting mixture was thoroughly stirred to obtain a clear solution, where the maltose, PVP, and water were in a molar ratio of 1:0.1:500 and the molar mass of the maltose was 0.01 mmol.

Step 2: A ferrous sulfate solution was added to the clear solution obtained in step 1, and the resulting mixture was stirred for 1 h to obtain a mixed solution A, where the molar mass of ferrous sulfate in the ferrous sulfate solution was 5.5 mmol.

Step 3: A sodium chloride solution was added to the mixed solution A obtained in step 2, and the resulting mixture was stirred for 1 h to obtain a mixed solution B, where the molar mass of sodium chloride in the sodium chloride solution was 1.5 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 130° C. for 18 h to obtain a flocculent product, where the molar mass of silver nitrate in the silver nitrate solution was 4 mmol.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 3 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times.

Example 8

A fabrication method was provided in this example, including the following steps:

Step 1: Glucose and PVP were added to deionized water, and the resulting mixture was thoroughly stirred to obtain a clear solution, where the glucose, PVP, and water were in a molar ratio of 1:0.08:560 and the molar mass of the glucose was 0.01 mmol.

Step 2: A copper sulfate solution was added to the clear solution obtained in step 1, and the resulting mixture was thoroughly stirred to obtain a mixed solution A, where the molar mass of copper sulfate in the copper sulfate solution was 5.4 mmol.

Step 3: A sodium chloride solution was added to the mixed solution A obtained in step 2, and the resulting mixture was thoroughly stirred to obtain a mixed solution B, where the molar mass of sodium chloride in the sodium chloride solution was 1.3 mmol.

Step 4: A silver nitrate solution was added dropwise to the mixed solution B obtained in step 3, the resulting mixture was stirred to obtain a reaction solution, and the reaction solution was transferred to a hydrothermal reactor and subjected to a reaction at 120° C. for 14 h to obtain a flocculent product, where the molar mass of silver nitrate in the silver nitrate solution was 5 mmol.

Figure 8:
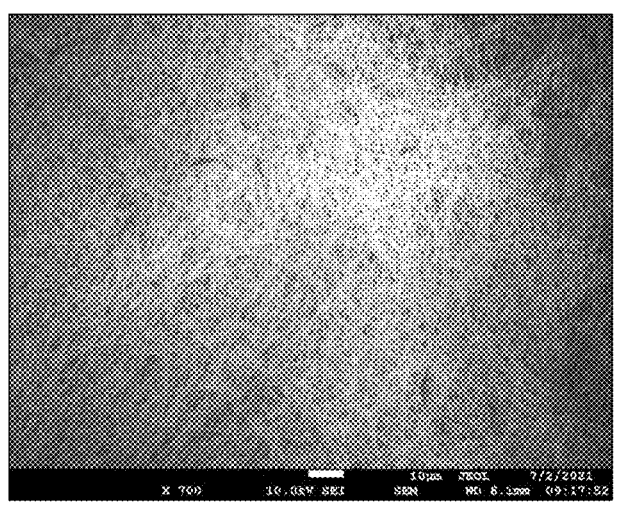
FIG. 8 is an SEM image of the ultra-long silver nanowire material fabricated in Example 8 of the present disclosure.

Step 5: The flocculent product obtained in step 4 was subjected to sedimentation washing with deionized water and absolute ethanol successively to obtain an ultra-long silver nanowire material, where the sedimentation washing was conducted as follows: The flocculent product was added to deionized water, and the resulting mixture was shaken and allowed to stand until the flocculent product and the deionized water were separated. The resulting supernatant was removed, deionized water was added, and the above process was repeated 5 times. The flocculent product was added to absolute ethanol, and the resulting mixture was shaken and allowed to stand until the flocculent product and the absolute ethanol were separated. The resulting supernatant was removed, absolute ethanol was added, and the above process was repeated 3 times. FIG. 8 is an SEM image of the ultra-long silver nanowire material fabricated in this example. It can be seen from FIG. 8 that the product has a nanowire structure; in the product, there is only a 1D nanowire structure without other impurities and morphologies, indicating a high purity. The obtained nanowires have a uniform diameter distribution, and the length-to-diameter ratio of the ultra-long silver nanowire material is much greater than 3,000.

Although specific implementations of the present disclosure are described above, those skilled in the art should understand that these are merely examples, and various changes or modifications can be made to these implementations without departing from the principle and essence of the present disclosure. Therefore, the claimed scope of the present disclosure shall be defined by the appended claims.

What is claimed is:
1. A fabrication method of a silver nanowire material, comprising the following steps:
step 1: adding glucose and polyvinylpyrrolidone (PVP) to deionized water and thoroughly stirring to obtain a clear solution; wherein the glucose, the PVP, and the deionized water are in a molar ratio of 1:(0.05-0.1):(280-560), and the molecular weight of the PVP is 1,300,000 daltons;
step 2: adding a ferrous sulfate solution to the clear solution obtained in step 1 and thoroughly stirring to obtain a mixed solution A; wherein a molar ratio of ferrous sulfate to the glucose in the mixed solution A is 1:(480-600);
step 3: adding a sodium chloride solution to the mixed solution A obtained in step 2 and thoroughly stirring to obtain a mixed solution B; wherein a molar ratio of sodium chloride to the ferrous sulfate in the mixed solution B is 1:(3-4.8);
step 4: adding a silver nitrate solution dropwise to the mixed solution B obtained in step 3, stirring to obtain a reaction solution, transferring the reaction solution to a hydrothermal reactor, and conducting a reaction at 110° C. to 130° C. for 14 h to 20 h to obtain a flocculent product; wherein a molar ratio of silver nitrate to the glucose in the reaction solution is 1:(300-500); and
step 5: subjecting the flocculent product to sedimentation washing with deionized water and absolute ethanol successively to obtain the silver nanowire material with a length-to-diameter ratio of greater than 1,000, wherein in step 5, the sedimentation washing is conducted as follows: adding the flocculent product to the deionized water, shaking, and allowing the resulting mixture to stand until the flocculent product and the deionized water are separated; removing a resulting supernatant, adding the deionized water, and repeating above process 3 to 5 times; adding the flocculent product to absolute ethanol, shaking, and allowing the resulting mixture to stand until the flocculent product and the absolute ethanol are separated; and removing a resulting supernatant, adding the absolute ethanol, and repeating above process 3 to 5 times.

2. The fabrication method of the silver nanowire material according to claim 1, wherein the glucose, the PVP, and the deionized water are in a molar ratio of 1:0.06:430.

3. A fabrication method of a silver nanowire material, comprising the following steps:
step 1: adding glucose and polyvinylpyrrolidone (PVP) to deionized water and thoroughly stirring to obtain a clear solution; wherein the glucose, the PVP, and the deionized water are in a molar ratio of 1:0.06:430, the molecular weight of the PVP is 1,300,000 daltons;
step 2: adding an iron nitrate solution to the clear solution obtained in step 1 and thoroughly stirring to obtain a mixed solution A; wherein a molar ratio of iron nitrate to the glucose in the mixed solution A is 1:(480-600);
step 3: adding a sodium chloride solution to the mixed solution A obtained in step 2 and thoroughly stirring to obtain a mixed solution B; wherein a molar ratio of sodium chloride to the iron nitrate in the mixed solution B is 1:(3-4.8);
step 4: adding a silver nitrate solution dropwise to the mixed solution B obtained in step 3, stirring to obtain a reaction solution, transferring the reaction solution to a hydrothermal reactor, and conducting a reaction at 115° C. for 15 h to obtain a flocculent product; wherein a molar ratio of silver nitrate to the glucose in the reaction solution is 1:(300-500); and
step 5: subjecting the flocculent product to sedimentation washing with deionized water and absolute ethanol successively to obtain the silver nanowire material.

4. The fabrication method of the silver nanowire material according to claim 3, wherein in step 5, the sedimentation washing is conducted as follows: adding the flocculent product to the deionized water, shaking, and allowing the resulting mixture to stand until the flocculent product and the deionized water are separated; removing a resulting supernatant, adding the deionized water, and repeating above process 3 to 5 times; adding the flocculent product to absolute ethanol, shaking, and allowing the resulting mixture to stand until the flocculent product and the absolute ethanol are separated; and removing a resulting supernatant, adding the absolute ethanol, and repeating above process 3 to 5 times.

5. A fabrication method of a silver nanowire material, comprising the following steps:
step 1: adding maltose and polyvinylpyrrolidone (PVP) to deionized water and thoroughly stirring to obtain a clear solution; wherein the glucose, the PVP, and the deionized water are in a molar ratio of 1:0.1:500, the molecular weight of the PVP is 8,000 daltons;
step 2: adding a ferrous sulfate solution to the clear solution obtained in step 1 and thoroughly stirring to obtain a mixed solution A; wherein a molar ratio of ferrous sulfate to the maltose in the mixed solution A is 1:(480-600);
step 3: adding a sodium chloride solution to the mixed solution A obtained in step 2 and thoroughly stirring to obtain a mixed solution B; wherein a molar ratio of sodium chloride to the ferrous sulfate in the mixed solution B is 1:(3-4.8);
step 4: adding a silver nitrate solution dropwise to the mixed solution B obtained in step 3, stirring to obtain a reaction solution, transferring the reaction solution to a hydrothermal reactor, and conducting a reaction at 130° C. for 18 h to obtain a flocculent product; wherein a molar ratio of silver nitrate to the maltose in the reaction solution is 1:(300-500); and
step 5: subjecting the flocculent product to sedimentation washing with deionized water and absolute ethanol successively to obtain the silver nanowire material.

6. The fabrication method of the silver nanowire material according to claim 5, wherein in step 5, the sedimentation washing is conducted as follows: adding the flocculent product to the deionized water, shaking, and allowing the resulting mixture to stand until the flocculent product and the deionized water are separated; removing a resulting supernatant, adding the deionized water, and repeating above process 3 to 5 times; adding the flocculent product to absolute ethanol, shaking, and allowing the resulting mixture to stand until the flocculent product and the absolute ethanol are separated; and removing a resulting supernatant, adding the absolute ethanol, and repeating above process 3 to 5 times.

* * * * *